US009774954B2

(12) United States Patent
Zhu et al.

(10) Patent No.: US 9,774,954 B2
(45) Date of Patent: Sep. 26, 2017

(54) IMPEDANCE DETECTION CIRCUIT, METHOD, AND INTEGRATED CIRCUIT

(71) Applicant: Fairchild Semiconductor Corporation, Sunnyvale, CA (US)

(72) Inventors: Peng Zhu, Tianjin (CN); Kenneth O'Brien, Gorham, ME (US); Jianing Zhou, Beijing (CN); Yongliang Li, Beijing (CN)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 0 days.

(21) Appl. No.: 14/622,544

(22) Filed: Feb. 13, 2015

(65) Prior Publication Data

US 2015/0233859 A1 Aug. 20, 2015

(30) Foreign Application Priority Data

Feb. 14, 2014 (CN) .......................... 2014 1 0062075
Mar. 19, 2014 (CN) .......................... 2014 1 0111546

(51) Int. Cl.
*G01N 27/22* (2006.01)
*H04R 5/04* (2006.01)

(52) U.S. Cl.
CPC ........... *H04R 5/04* (2013.01); *H04R 2420/05* (2013.01)

(58) Field of Classification Search
CPC ........................... G01N 27/228; G01N 27/221
USPC .......................................................... 324/672
See application file for complete search history.

(56) References Cited

U.S. PATENT DOCUMENTS 5,425,859 A * 6/1995 Tench ...................... B23K 1/20 204/400
8,553,431 B2 10/2013 Zheng
2009/0174587 A1* 7/2009 Ogawa ................ H03K 17/302 341/144
2010/0195355 A1* 8/2010 Zheng .............. H02M 3/33507 363/21.12

(Continued)

FOREIGN PATENT DOCUMENTS

CN 1364235 A 8/2002
CN 101069410 A 11/2007

(Continued)

OTHER PUBLICATIONS

Wolfram MathWorld, Inflection Point, 2017, p. 1.*
"Chinese Application Serial No. 201410111546.4, Office Action maiied Apr. 5, 2017", 13 pgs.

*Primary Examiner* — Jermele M Hollington
(74) *Attorney, Agent, or Firm* — Brake Hughes Bellerman LLP

(57) ABSTRACT

This document discusses, among other things, an impedance detection circuit, method, and integrated circuit, comprising a ramp-up current generation circuit and an impedance determining circuit, wherein the ramp-up current generation circuit is configured to input a ramp-up current including n breaks to a port of a device where the ramp-up current generation circuit is disposed, to which port an external device is connected, and wherein the impedance determining circuit is configured to detect an impedance of the external device in each break time period of the ramp-up current input by the ramp-up current generation circuit until the impedance of the external device is acquired by detection in the last break time period of the n breaks.

20 Claims, 10 Drawing Sheets

(56) References Cited

U.S. PATENT DOCUMENTS

| | | | | |
|---|---|---|---|---|
| 2012/0149434 | A1 | 6/2012 | Stenmark et al. | |
| 2013/0335030 | A1* | 12/2013 | Joe | H01M 10/052 320/134 |

FOREIGN PATENT DOCUMENTS

| | | | |
|---|---|---|---|
| CN | 101365261 | A | 2/2009 |
| CN | 101395803 | A | 3/2009 |
| CN | 102008028 | A | 4/2011 |
| CN | 102308562 | A | 1/2012 |
| CN | 102413239 | A | 4/2012 |
| CN | 102638743 | A | 8/2012 |
| CN | 102739231 | A | 10/2012 |
| CN | 103197199 | A | 7/2013 |

* cited by examiner

| | | | | | | | | | | | |
|---|---|---|---|---|---|---|---|---|---|---|---|
| D11 | D12 | D13 | D14 | D | D | D | D | D15 | D16 | D17 | D18 |
| D38 | D7 | 89 | 81 | 73 | 65 | 69 | 77 | 85 | D5 | D9 | D19 |
| D37 | D3 | 33 | 37 | 45 | 53 | 59 | 51 | 43 | 35 | D1 | D20 |
| D36 | 87 | 41 | 1 | 5 | 17 | 21 | 11 | 3 | 39 | 83 | D21 |
| D | 80 | 49 | 9 | 13 | 25 | 29 | 15 | 7 | 47 | 75 | D |
| B | 72 | 57 | 24 | 32 | 61 | 63 | 27 | 19 | 55 | 67 | D |
| D | 68 | 56 | 20 | 28 | 64 | 62 | 31 | 23 | 58 | 71 | D |
| D | 76 | 48 | 8 | 16 | 30 | 26 | 14 | 10 | 50 | 79 | D |
| D35 | 84 | 40 | 4 | 12 | 22 | 18 | 6 | 2 | 42 | 86 | D22 |
| D34 | D2 | 36 | 44 | 52 | 60 | 54 | 46 | 38 | 34 | D4 | D23 |
| D33 | D10 | D6 | 88 | 78 | 70 | 66 | 74 | 82 | 90 | D8 | D24 |
| D32 | D31 | D30 | D29 | D | D | D | D | D28 | D27 | D26 | D25 |

IMPEDANCE DETECTION CIRCUIT, METHOD, AND INTEGRATED CIRCUIT

CLAIM OF PRIORITY

The application claims the benefit of priority under 35 U.S.C. §119(a) to Peng Zhu et al. CN Application Nos. 201410062075.2, filed on Feb. 14, 2014, and 201410111546.4, filed on Mar. 19, 2014, which are hereby incorporated by reference in their entirety.

TECHNICAL FIELD

The present invention relates to impedance detection technologies, and in particular, to an impedance detection circuit, method, and integrated circuit.

BACKGROUND

With the development of technology, at present, cell phones, especially smart phones, have become indispensable electronic devices in people's daily lives. In addition, as people's daily requirements for cell phones become higher and higher, they desire cell phones capable of implementing more functions, such as supporting the connection of various types of external devices thereto, to satisfy usage requirements and enhance the user experience.

Currently, cell phones fail to effectively and accurately detect the impedance of an external device connected thereto. Therefore, they are merely capable of identifying few external devices.

OVERVIEW

To solve the technical problem in the related art, the present inventors have recognized, among other things, an impedance detection circuit, method, and integrated circuit.

In an example, an impedance detection circuit includes a ramp-up current generation circuit and an impedance determining circuit. The ramp-up current generation circuit can be configured to input a ramp-up current including n breaks to a port of a device where the ramp-up current generation circuit is disposed, to which port an external device is connected. The impedance determining circuit can be configured to detect an impedance of the external device in each break time period of the ramp-up current input by the ramp-up current generation circuit until the impedance of the external device is acquired by detection in the last break time period of the n breaks. In an example, an integrated circuit can include the impedance detection circuit.

In an example, an impedance detection method includes inputting a ramp-up current including n breaks to a port of a device where the impedance detection circuit is disposed, to which port an external device is connected, and detecting an impedance of the external device in each break time period of the ramp-up current input by the ramp-up current generation circuit until the impedance of the external device is acquired by detection in the last break time period of the n breaks.

According to the impedance detection circuit, the impedance detection method, or the integrated circuit provided herein, in the process of inputting a ramp-up current including n breaks to a port of a device to which port an external device is connected, an impedance of the external device can be detected in each break time period of the ramp-up current until the impedance of the external device is acquired by detection in the last break time period of the n breaks. Since the impedance of the external device can be detected in each break time period of the ramp-up current before the impedance of the external is detected in the last break time period of the n breaks, accordingly, the impedance of the external device may be precisely detected.

In addition, the current input to the port of the device, to which port the external device is connected, can include a ramp-up current. As such, during the impedance detection, a great pulse may not be generated. Great pulses may generate great noise, which cannot be eliminated. In other words, since the current input to the port of the device, to which port the external device is connected is a ramp-up current, during the impedance detection, less noise is generated, and thus the user experience is improved.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In various embodiments of the present subject matter, in the process of inputting a ramp-up current including n breaks to a port of a device to which port an external device is connected, an impedance of the external device is detected in each break time period of the ramp-up current until the impedance of the external device is acquired by detection in the last break time period of the n breaks.

Figure 1:
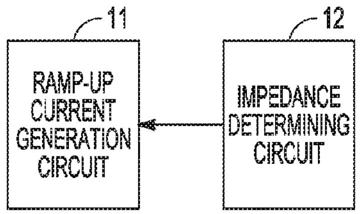
FIG. 1 is a schematic structural diagram of an impedance detection circuit.

An embodiment of the present invention includes an impedance detection circuit. As illustrated in FIG. 1, the impedance detection circuit comprises a ramp-up current generation circuit 11 and an impedance determining circuit 12.

The ramp-up current generation circuit 11 inputs a ramp-up current including n breaks to a port of a device where the ramp-up current generation circuit is disposed, to which port an external device is connected. In the process of inputting the ramp-up current, the impedance determining circuit 12 detects an impedance of the external device in each break time period of the ramp-up current input by the ramp-up current generation circuit 11 until the impedance of the external device is acquired by detection in the last break time period of the n breaks.

The device where the ramp-up current generation circuit 11 is disposed may be an electronic device, such as a cellphone or the like.

Figure 2:
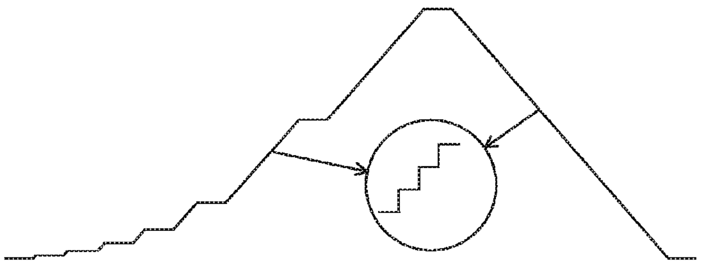
FIG. 2 is a schematic structural diagram of a ramp-up current and a ramp-down current.

As illustrated in FIG. 2, the ramp-up current including n breaks refers to a current which includes n break platforms and has a specific rising slop as the time goes by. The length of the break time period corresponding to a break platform may be defined according to actual needs, for example, defined to 5 ms or the like. The speed of the rising of the ramp-up current may also be defined according to actual needs, for example, defined to 3.125 μA/30 μs or the like. In addition, as illustrated in FIG. 2, in practice, after the ramp-up current is amplified, it can be seen that the ramp-up current is formed of several currents each having a rising platform.

In practice, the impedance range of the external device to be detected may be firstly defined to eight sub-ranges according to actual needs, as listed in Table 1. Since the impedance range is defined to eight sub-ranges, accordingly seven breaks need to be set. Correspondingly, corresponding seven breaks are preset in the ramp-up current generation current 11. That is, the ramp-up current generated by the ramp-up current generation circuit 11 includes seven breaks at maximum.

TABLE 1

| External Device | Target Reference Impedance/ohm | Target Impedance Range/ohm |
|---|---|---|
| Headset with a microphone #1 | 16 | 0-24 |
| Headset with a microphone #2 | 32 | 24-42 |
| Headset with a microphone #3 | 64 | 42-100 |
| Headset with a microphone #4 | 150 | 100-200 |
| Headset with a microphone #5 | 300 | 200-450 |
| Headset with a microphone #6 | 600 | 450-1K |
| Linear input/output (cellphone carkit) | 2K | 1K-15K |
| Humidity | >15K | >15K |

In practice, when a ramp-up current needs to be input, the ramp-up current generation circuit 11 inputs a ramp-up current to the port according to a speed set by the ramp-up current generation circuit 11. When the first break time is reached, the impedance determining circuit 12 detects the impedance of the external device in the first break time period. When the impedance of the external device fails to be detected in the first break time period, upon completion of the break time, the ramp-up current generation circuit 11 continues to input the ramp-up current to the port. Correspondingly, when the second break time is reached, the impedance determining circuit 12 detects the impedance of the external device in the second break time period. When the impedance of the external device fails to be detected in the second break time period, upon completion of the break time, the ramp-up current generation circuit 11 continues to input the ramp-up current to the port. Such operations are performed analogously until the impedance determining circuit 12 acquires by detection the impedance of the external device. Upon detection of the impedance of the external device, the ramp-up current generation circuit stops inputting the ramp-up current to the port. In this case, the value of n is equal to the number of break time periods corresponding to the detected impedance of the external device. To be specific, the value of n is an integer greater than 0, and the maximum value of n is equal to the number of breaks that are predetermined in the ramp-up current generation circuit 11. For example, if the number of breaks that are predetermined in the ramp-up current generation circuit 11 is 7 and the impedance determining circuit 12 acquires by detection the impedance of the external device in the fourth break time period, the value of n is 4. When the impedance determining circuit 12 detects the impedance of the external device in the seventh break time period, the value of n is 7. To be specific, the maximum value of n is 7.

In practice, the detected impedance of the external device is a value range. Using Table 1 as an example, the detected impedance of the external device may be 0 to 24 ohms, 24 to 42 ohms, 42 to 100 ohms, 100 to 200 ohms, 200 to 450 ohms, 450 to 1000 ohms, 1000 to 15000 ohms, or greater than 15000 ohms.

The external device may be an external audio device, for example, an earphone, a speaker, or the like.

In practice, the impedance determining circuit 12 may send the detected impedance of the external device to other circuits which need to acquire the impedance of the external device, for example, circuits which need to identify which type of device the external device is, or the like.

When the impedance of the external device is acquired by detection, the ramp-up current generation circuit 11 input a ramp-down current to the port, such that the input current is gradually reduced to zero. As such, the generated noise may be reduced. Herein, as illustrated in FIG. 2, the ramp-down current refers to a current which has a specific falling slope as the time goes by.

Figure 3:
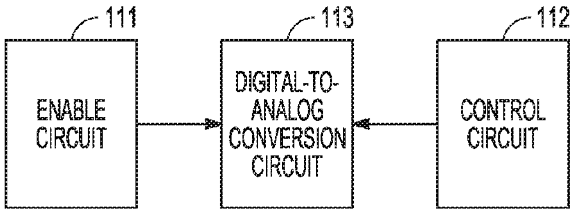
FIG. 3 is a schematic structural diagram of a ramp-up current generation circuit.

As illustrated in FIG. 3, the ramp-up current generation circuit may comprise: an enable circuit 111, a control circuit 112, and a digital-to-analog conversion circuit 113.

When a ramp-up current needs to be input, the enable circuit 111 inputs an enable signal to the digital-to-analog conversion circuit 113. Upon receiving the enable signal input by the enable circuit 111, the digital-to-analog conversion circuit 113 converts the ramp-up current that needs to be input from a digital signal to an analog signal and inputs the converted analog signal of the ramp-up current to the port according to the clock control signal output by the control circuit 112. The control circuit 112 inputs a corresponding clock control signal to the digital-to-analog conversion circuit 113 according to a magnitude of a ramp-up current that needs to be input.

Herein, the implementation of the enable circuit 111 is a common technical means for a person skilled in the art, which is thus not described herein any further.

Figure 4:
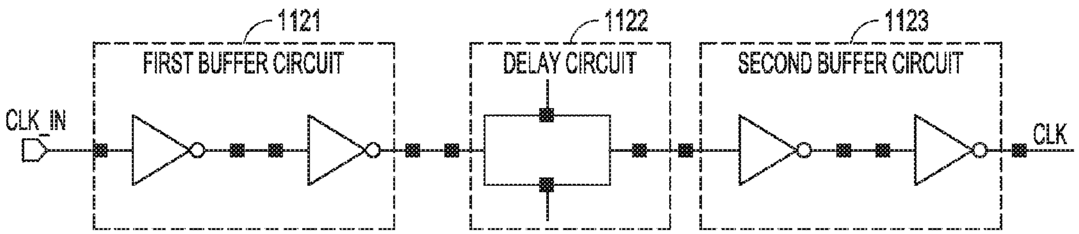
FIG. 4 is a schematic structural diagram of a latch clock generation circuit in a control circuit.

The control circuit 112 may comprise a latch clock generation circuit. As illustrated in FIG. 4, the latch clock generation circuit may comprise: a first buffer circuit 1121, a delay circuit 1122, and a second buffer circuit 1123. An input terminal of the first buffer circuit 1121 is connected to an input terminal CLK_in of a control clock, and an output terminal of the first buffer circuit 1121 is connected to an input terminal of the delay circuit 1122. An output terminal of the delay circuit 1122 is connected to an input terminal of the second buffer circuit 1123. An output terminal of the second buffer circuit 1123 is connected to the digital-to-analog conversion circuit 113. That is, the latch clock signal CLK generated by the latch clock generation circuit is transmitted to the digital-to-analog conversion circuit 113. Herein, in case of a break of the ramp-up current, the latch clock generation circuit does not output a latch clock signal. As such, it is ensured that the power source of the digital-to-analog conversion circuit remains constant, such that the impedance of the external device can be more precisely detected.

Figure 5:
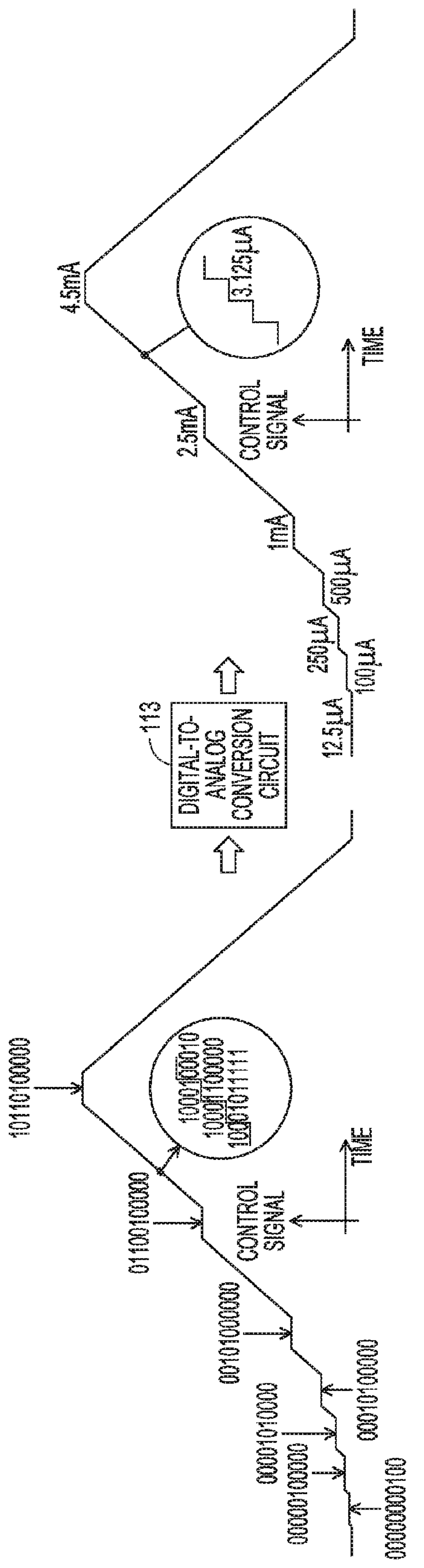
FIG. 5 is a schematic view of a process of converting a binary control signal to a current.

In practice, as illustrated in FIG. 5, the control circuit 112 provides a multi-bit binary control signal that progressively increases or decreases as the clock varies, such that the digital-to-analog conversion circuit 113 generates a corresponding ramp-up current or ramp-down current. In addition, in the generated ramp-up current, within various break time periods, the multi-bit control signal stops varying with the clock. To be specific, the ramp-up current stops progressively increasing, such that the current output by the digital-to-analog conversion circuit 113 stops staying on the current of the corresponding break, thereby implementing the "current platform" which is needed during the impedance detection. Herein, bits of the binary control signal provided by the control circuit 112 may be defined according to actual needs. For example, using the parameters in Table 1 as an example, it may be determined that the binary control signal provided by the control circuit 112 has 11 bits.

Figure 6:
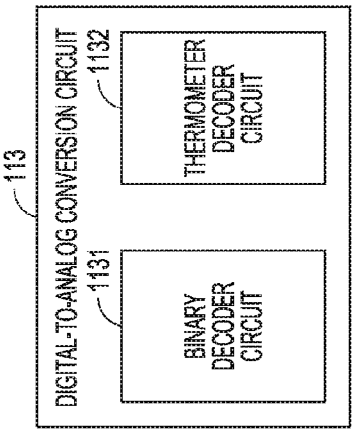
FIG. 6 is a schematic structural diagram of digital-to-analog conversion circuit.

As illustrated in FIG. 6, the digital-to-analog conversion circuit 113 may comprise a binary decoder circuit 1131 and a thermometer decoder circuit 1132.

When the ramp-up current that needs to be input is equal to the maximum current that can be processed by the binary decoder circuit 1131, the control circuit 112 inputs a corresponding clock control signal to the binary decoder circuit 1131, and the binary decoder circuit 1131 converts the ramp-up current that needs to be input from a digital signal to an analog signal and inputs the converted analog signal of the ramp-up current to the port according to the received clock control signal input by the control circuit 112.

When the ramp-up current that needs to be input is greater than the maximum current that can be processed by the binary decoder circuit 1131, the control circuit 112 inputs a corresponding clock control signal to the thermometer decoder circuit 1132, and the thermometer decoder circuit 1132 converts the ramp-up current that needs to be input from a digital signal to an analog signal and inputs the converted analog signal of the ramp-up current to the port according to the received clock control signal input by the control circuit 112. Alternatively, the control circuit 112 simultaneously inputs a corresponding clock control signal to the binary decoder circuit 1131 and the thermometer decoder circuit 1132, and the binary decoder circuit 1131 and the thermometer decoder circuit 1132 each convert the ramp-up current that needs to be input from a digital signal to an analog signal and input the converted analog signal of the ramp-up current to the port according to the received clock control signal input by the control circuit 112.

Figure 7A:
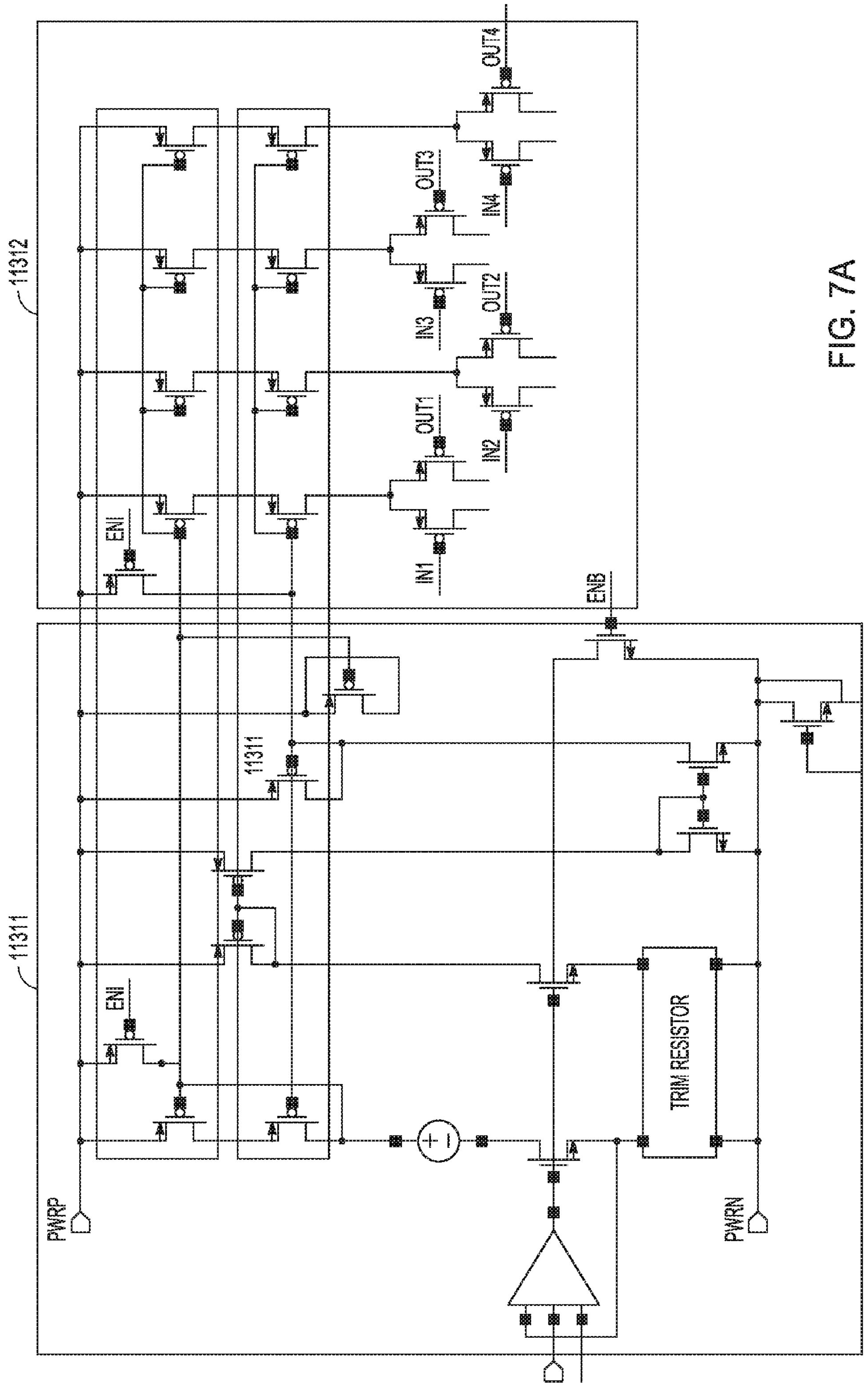
FIGS. 7A-7B are schematic structural diagrams of a binary decoder circuit.
Figure 7B:
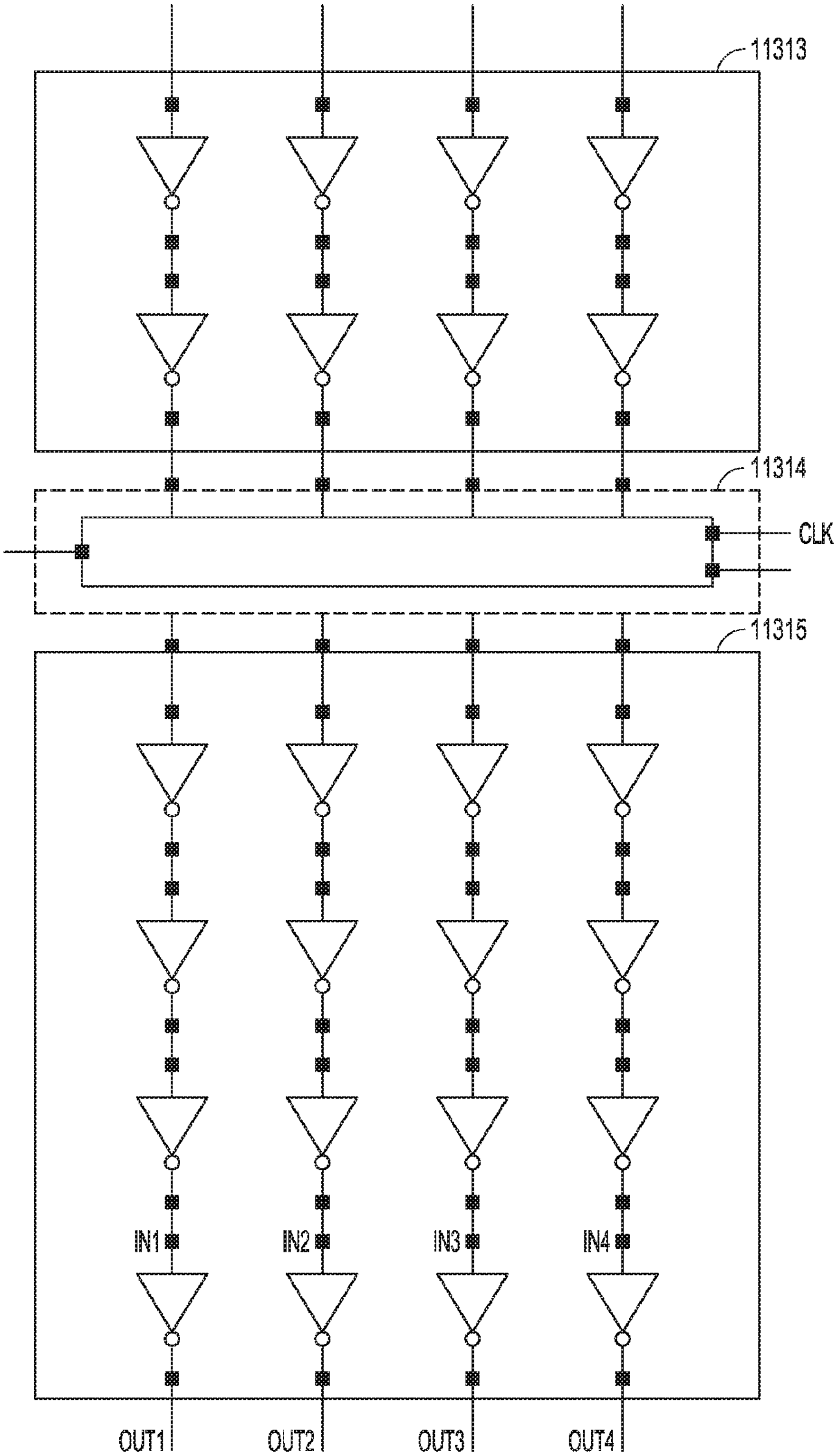

In practice, as illustrated in FIG. 7A and FIG. 7B, the binary decoder circuit 1131 may comprise: a first reference current generation circuit 11311, a current source 11312, a first delay shaping circuit 11313, a latch circuit 11341, and a second delay shaping circuit 11315. In FIG. 7A, eni indicates an enable signal that is output by the enable circuit 111, and enb indicates a reverse signal of the enable signal that is output by the enable circuit 111. To be specific, the first reference current generation circuit 11311 may be formed of seven p-channel metal-oxide-semiconductor field-effect transistor (PMOSFETs), six n-channel metal-oxide-semiconductor field-effect transistors (NMOSFETs), an operation amplifier, and a trim resistor. Bits of the binary decoder circuit 1131 are defined according to actual needs, the number of different current sources in the current source 11312 is the same as the number of bits. For example, using the parameters in Table 1 as an example, the number of bits in the binary decoder circuit 1131 may be defined to 4. Correspondingly as illustrated in FIG. 7A, the current source 11312 is formed of 17 PMOSFETs, thereby forming four different current sources capable of outputting currents including 3.125 μA, 6.25 μA, 12.5 μA, and 25 μA. Correspondingly, as illustrated in FIG. 7B, the first delay shaping circuit 11313 and the second delay shaping circuit 11315 each comprise the delay shaping circuit corresponding to each of the four current sources. The trim resistor is directed to enabling the reference current generated by the first reference current generation circuit 11311 to be constant within a defined error range. The latch circuit 11314 is directed to reducing noise pulses of the analog signals, and enabling the generated analog signal of the ramp-up current to be smoother. To be specific, the function of the latch circuit 11314 may be understood as reducing glitches of the analog signals.

Figure 8A:
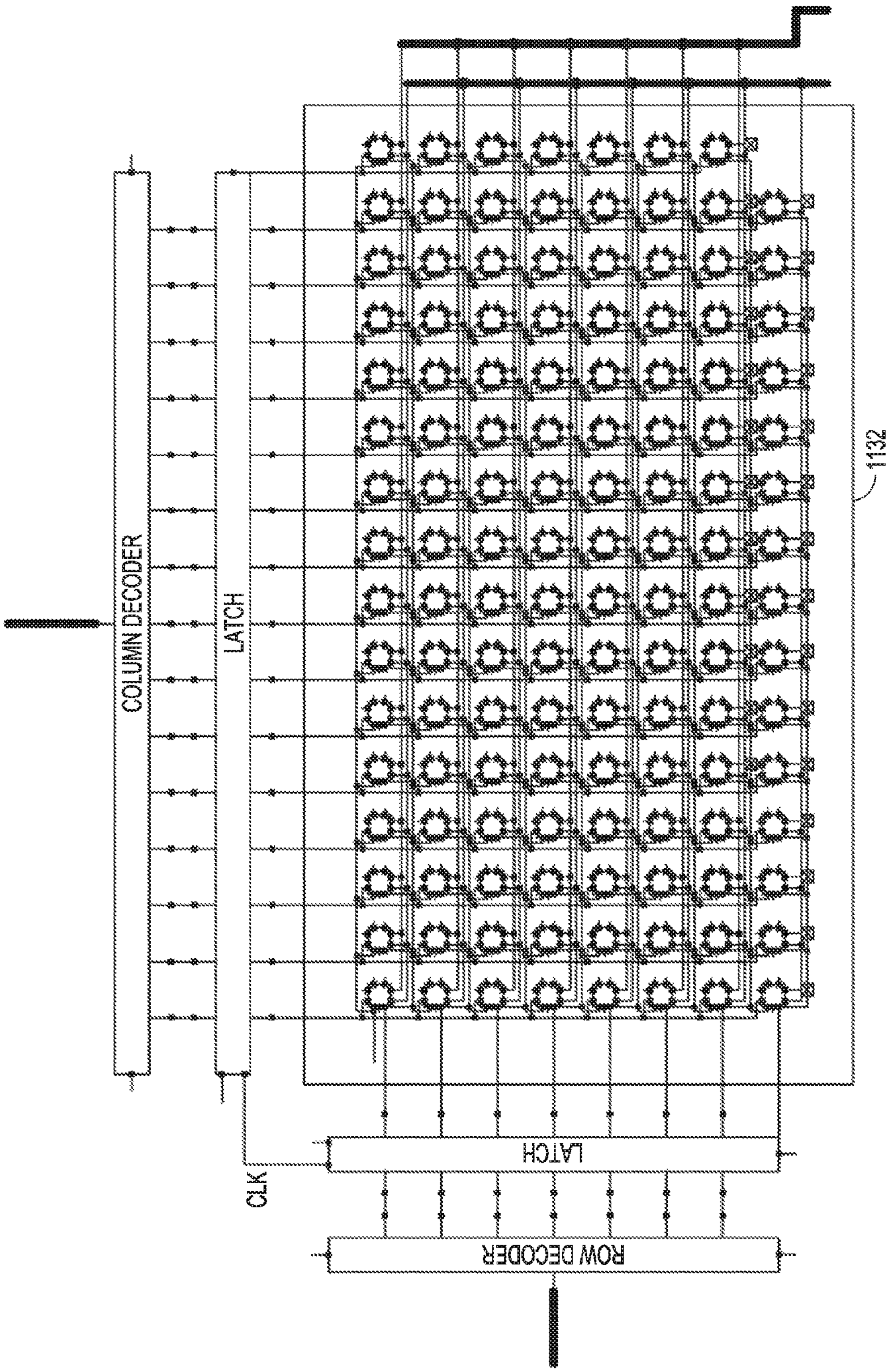
FIGS. 8A-8C are schematic structural diagrams of a thermometer decoder circuit.
Figure 8B:
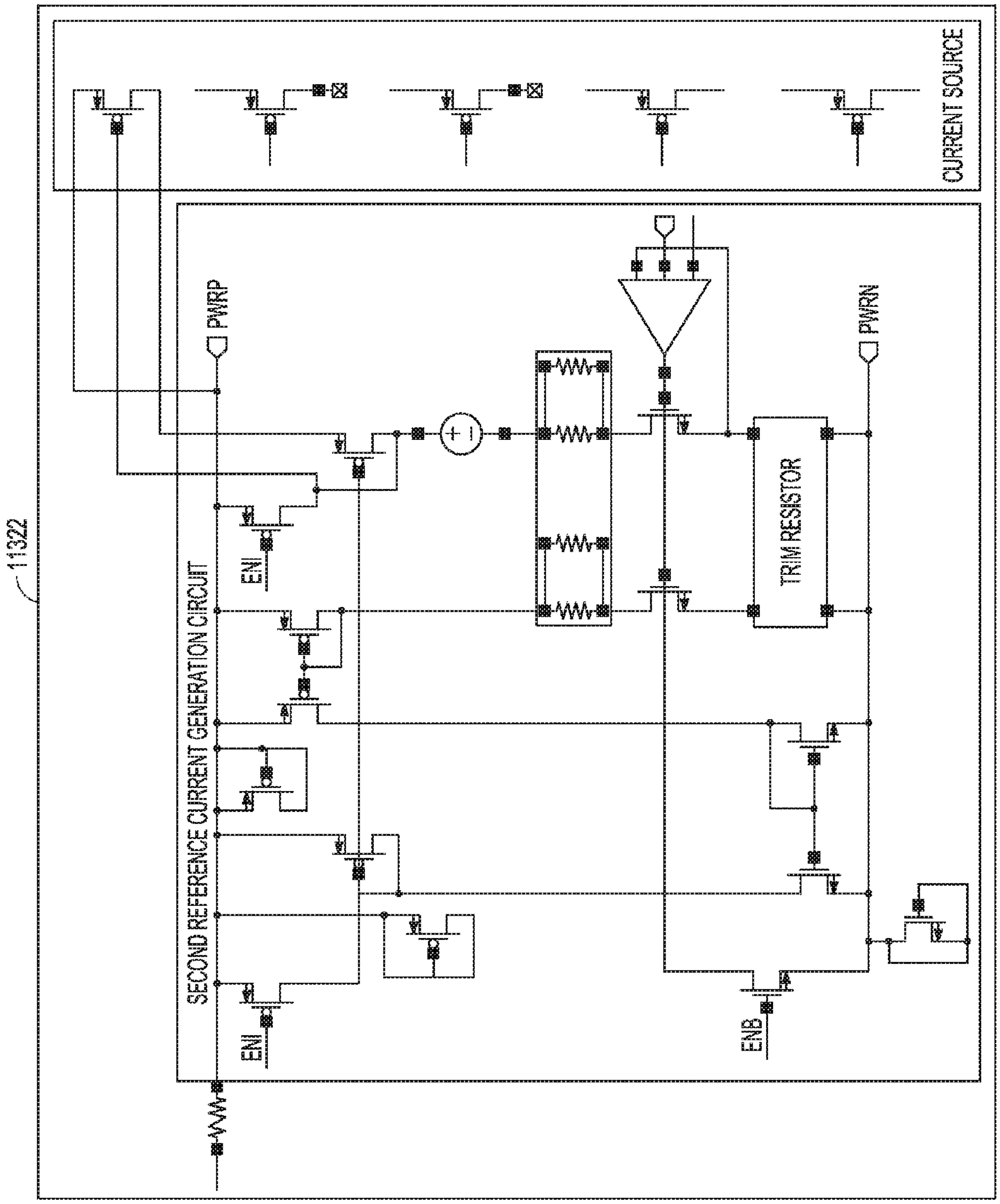
Figure 8C:
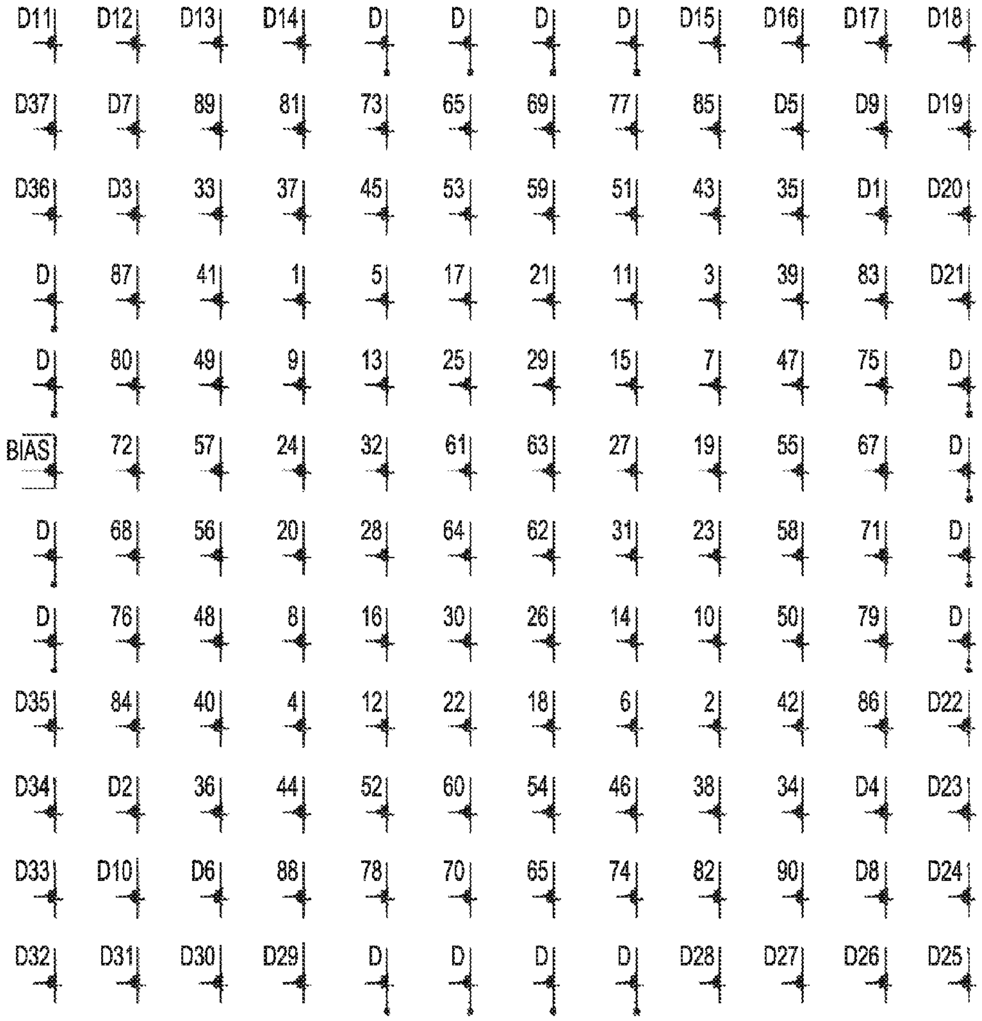
Figure 9:
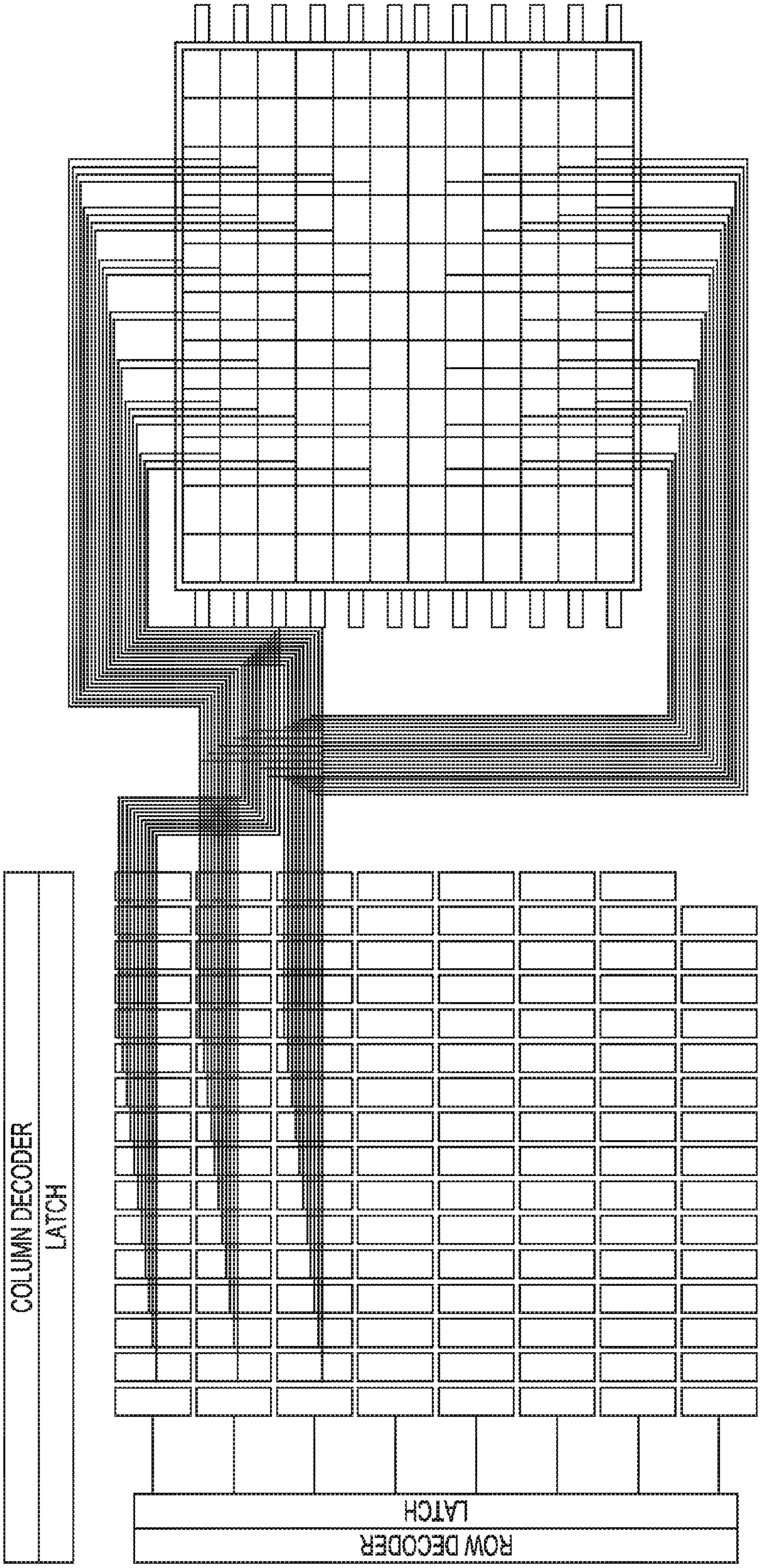
FIG. 9 is a schematic diagram of connection of switch units and current source units when the thermometer decoder circuit is working.

In practice, as illustrated in FIG. 8A, FIG. 8B, and FIG. 8C, the thermometer decoder circuit 1132 may comprise: a thermometer switch matrix 11321, a thermometer current source matrix 11322 comprising a second reference current generation circuit, and a corresponding auxiliary circuit. Bits of the thermometer decoder circuit 1132 are defined according to actual needs. Correspondingly, the number of switch units in the thermometer switch matrix 11321 is defined according to actual needs, and the number of current source units in the thermometer current source matrix 11322 is also defined according to actual needs. The number of switch units can be equal to the number of current source units. For example, using the parameters in Table 1 as an example, the number of bits in the thermometer decoder circuit 1132 may be defined to 7, and correspondingly, the number of switch units is 127, the number of current source units is 127, and the current output by each of the current source units is 50 μA. As illustrated in FIG. 8A, the auxiliary circuit may comprise: a row decoder, a column decoder, and latches respectively corresponding to the row decoder and the column decoder, and the like. When the thermometer decoder circuit 1132 is operating, as illustrated in FIG. 9, the corresponding switch units in the thermometer switch matrix 11321 are switched on according to the digital signal of the input ramp-up current, such that the current source units connected to the switch units output currents, thereby outputting a desired ramp-up current to the port. In FIG. 9, the matrix on the left is the thermometer switch matrix, and the matrix on the right is the thermometer current source matrix.

Figures 10, 11:
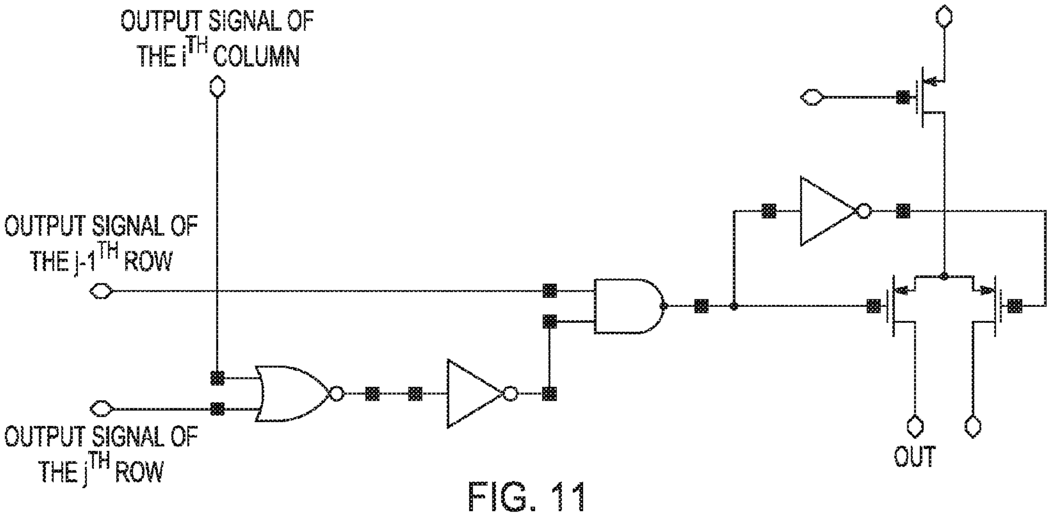
FIG. 10 is a schematic diagram of positions of the current source units in the thermometer decoder circuit.
FIG. 11 is a schematic structural diagram of a switch unit in the thermometer decoder circuit.

As illustrated in FIG. 10, to reduce the linear error affection, the corresponding current source units are sequentially switched on in a centrosymmetric manner. To reduce the quadratic error affection, the current source units in the thermometer current source matrix 11322 can be disposed at centers of four bump pads, and the corresponding current source units are sequentially switched on in an inward or outward diffusion manner by means of being symmetric to the centers of the four bump pads and centering on a disposed boundary circle. The linear error can be caused by the process of fabricating the components in the current source units, for example, dopants, the thickness of the oxide, and the like. The quadratic error can be caused by the packaging and separation process of the chip where the impedance detection circuit according to the embodiments is disposed, for example, the temperature maintained in the process of growing the bumps, the stress generated in the fabrication process, and the like. In FIG. 10, the black block can indicate a set boundary circle.

In practice, as illustrated in FIG. 11, the switch unit may be formed of a NOR gate, two inverters, a NAND gate, and three PMOSFETs.

Figure 12:
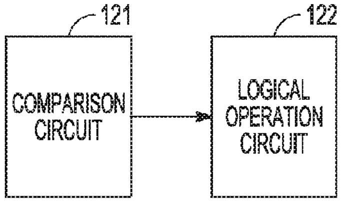
FIG. 12 is a schematic structural diagram of an impedance determining circuit.

As illustrated in FIG. 12, the impedance determining circuit 12 may include a comparison circuit 121 and a logical operation circuit 122, wherein the comparison circuit 121 may be implemented by a comparator. An inverting input terminal of the comparator is connected to a reference voltage, and a non-inverting input terminal of the comparator is connected to the port.

The logical operation circuit 122 determines, according to a comparison result of the comparator 121, whether the impedance of the external device is acquired by detection.

To be specific, the ramp-up current generation circuit 11 inputs a ramp-up current to the port. When the first break time is reached, the comparison circuit 121 compares a voltage of the port with a reference voltage, and sends a comparison result to the logical operation circuit 122. When the comparison result is a high voltage signal, the logical operation circuit 122 determines the impedance of the external device according to the high voltage signal, the corresponding number of times of breaks, the saved number of times of breaks, and a corresponding impedance range. When the comparison result is a low voltage signal, the logical operation circuit 122 determines whether the break is the last break of all the set breaks, and the logical operation circuit 122 triggers the ramp-up current generation circuit 11 when it is determined that the break is not the last break. The ramp-up current generation circuit 11 continues to input the ramp-up current to the port upon receiving the trigger of the logical operation circuit 122 and upon completion of the corresponding break time. When the second break time is reached, the comparison circuit 121 compares a voltage of the port with a reference voltage, and sends a comparison result to the logical operation circuit 122. When the comparison result is a high voltage signal, the logical operation circuit 122 determines the impedance of the external device according to the high voltage signal, the corresponding number of breaks, the saved number of breaks, and a corresponding impedance range. When the comparison result is a low voltage signal, the logical operation circuit 122 determines whether the break is the last break of all the set breaks, and the logical operation circuit 122 sends to the ramp-up current generation circuit 111 a command for continuing to input the ramp-up current when it is determined that the break is not the last break. When it is determined that the break is the last break, the logical operation circuit 122 determines the impedance of the external device according to the low voltage signal, the corresponding number of times of breaks, the saved number of times of breaks, and a corresponding impedance range. Such determinations are performed analogously until the impedance of the external device is determined.

Herein, it should be noted that when the logical operation circuit 122 determines that the current break is the last break of all the set breaks, and when the comparison result is a low voltage signal and the comparison result is a high voltage signal, the saved corresponding impedance ranges are different. Therefore, in this case, the impedance ranges of the external device that are determined are two different impedance ranges. Using the parameters in Table 1 as an example, when the current break is the last break, that is, the last break is the seventh break of all the set breaks, and when the comparison result is a low voltage signal, it is determined that the impedance range of the external device is 0 to 24 ohms. When the comparison result is a high voltage signal, it is determined that the impedance range of the external device is 24 to 42 ohms.

When one break of all the set breaks ends, the reference voltage of the comparison circuit 121 may be correspondingly regulated. Using the parameters in Table 1 as an example, the input ramp-up current and the corresponding reference voltage of the comparison circuit 122 may be referenced to Table 2.

TABLE 2

| | Impedance break | | | | | | |
|---|---|---|---|---|---|---|---|
| | 24 ohms | 42 ohms | 100 ohms | 200 ohms | 450 ohms | 1K ohms | 15K ohms |
| Input ramp-up current | 4.5 mA | 2.5 mA | 1 mA | 500 μA | 250 μA | 100 μA | 12.5 μA |
| Reference voltage of comparator | 108 mV | 105 mV | 100 mV | 100 mV | 112.5 mV | 100 mV | 187.5 mV |

In practice, to improve the detection precision, the comparison circuit 121 may be enabled to output comparison results multiple times according to actual needs. For example, the comparison circuit 121 may be enabled to output the comparison results three times, and correspondingly, the logical operation circuit 122 determines the comparison result is a high voltage signal or a low voltage signal according to the comparison results output three times. To be specific, when the comparison results output three times indicate more than two high voltage signals, it is determined that the comparison result is a high voltage signal, and when the comparison result output three times indicate more than two low voltage signals, it is determined that the comparison result is a low voltage signal. Herein, the high voltage signal refers to a signal indicating that the voltage of the port is greater than the reference voltage, and the low voltage signal refers to a signal indicating that the voltage of the port is less than the reference voltage. For example, if the signals output by the comparator include two types of signals 0 and 1, then 1 is a high voltage signal and 0 is a low voltage signal.

Figure 13:
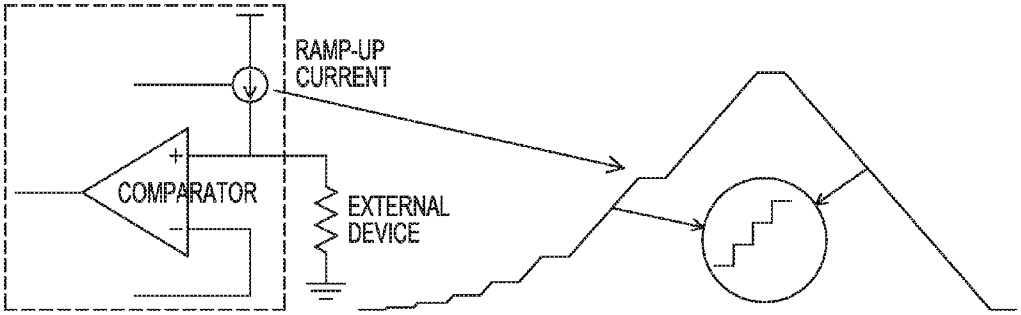
FIG. 13 is a schematic diagram of a specific detection manner.

As illustrated in FIG. 13, in practice, a non-inverting input pin of the comparator is connected to an external device. During the impedance detection, a ramp-up current is input to the non-inverting input pin, and the impedance of the external device is detected in each break time period of the ramp-up current. In addition, after the impedance of the external device is acquired by detection, a ramp-down current is input to the non-inverting input pin of the comparator, such that the input current is gradually reduced to zero. As such, the generated noise may be reduced.

It should be noted that: When the impedance detection circuit is operating, some components in various circuits of the impedance detection circuit also need to be connected to a power source, and additionally need to be grounded. As such, the impedance detection circuit is capable of operating normally. Therefore, in the corresponding drawings, pwrp indicate a power source node, and pwrn indicates a ground node.

According to the impedance detection circuit provided herein, the ramp-up current generation circuit can input a ramp-up current including n breaks to a port of the device where the ramp-up current generation circuit is disposed, to which port an external device is connected. In the process of inputting the ramp-up current, the impedance determining circuit detects an impedance of the external device in each break time period of the ramp-up current input by the ramp-up current generation circuit until the impedance of the external device is acquired by detection in the last break time period of the n breaks. Since the impedance of the external device is detected in each break time period of the ramp-up current before the impedance of the external is acquired by detection in the last break time period of the n breaks, accordingly the impedance of the external device may be precisely acquired by detection.

In addition, the current input to the port of the device, to which port the external device is connected is a ramp-up current. As such, during the impedance detection, a great pulse may not be generated. Great pulses may generate great noise, which cannot be eliminated. In other words, since the current input to the port of the device, to which port the external device is connected is a ramp-up current, during the impedance detection, less noise is generated, and thus the user experience is improved.

Figure 14:
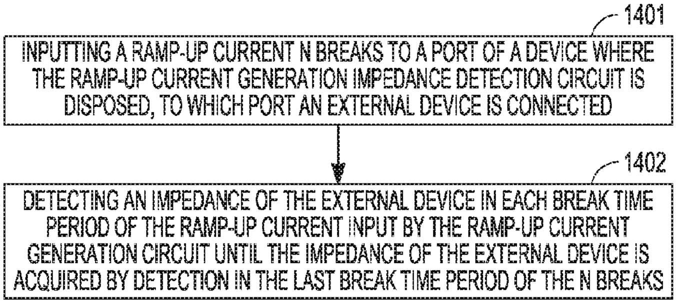
FIG. 14 is a schematic flowchart of an impedance detection method.

Based on the above described impedance detection circuit, an embodiment includes an impedance detection method. As illustrated in FIG. 14, the method comprises the following steps:

Step 1401: Inputting a ramp-up current including n breaks to a port of a device where the impedance detection circuit is disposed, to which port an external device is connected.

Herein, the device where the impedance detection circuit is disposed may be such an electronic device as a cellphone or the like.

The external device may be an external audio device, for example, an earphone, a speaker, or the like.

As illustrated in FIG. 2, the ramp-up current including n breaks refers to a current which includes n break platforms and has a specific rising slop as the time goes by. The length of the break time period corresponding to a break platform may be defined according to actual needs, for example, defined to 5 ms or the like. The speed of the rising of the ramp-up current may also be defined according to actual needs, for example, defined to 3.125 μA/30 μs is or the like.

In practice, the impedance range of the external device to be detected may be firstly defined to eight sub-ranges according to actual needs, as listed in Table 1. Since the impedance range is defined to eight sub-ranges, accordingly seven breaks need to be set. That is, the input ramp-up current includes seven breaks at maximum.

The step specifically comprises generating an enable signal when the ramp-up current needs to be input, and upon receiving the enable signal, converting the ramp-up current that needs to be input from a digital signal to an analog signal and inputting the converted analog signal of the ramp-up current to the port according to the clock control signal.

In an embodiment, the ramp-up current that needs to be input is converted from the digital signal to the analog signal through a binary decoding course and/or a thermometer decoding course. To be specific, when the ramp-up current that needs to be input is less than or equal to the maximum current that can be processed by a binary decoder circuit in the impedance detection circuit, the ramp-up current that needs to be input is converted from a digital signal to an analog signal through a binary decoding course. When the ramp-up current that needs to be input is greater than the maximum current that can be processed by the binary decoder circuit, the ramp-up current that needs to be input is converted from a digital signal to an analog signal through a thermometer decoding course, or when the ramp-up current that needs to be input is greater than the maximum current than can be processed by the binary decoder circuit, the ramp-up current is converted from a digital signal to an analog signal through a thermometer decoding course and a binary decoding course.

Step 1402: Detecting an impedance of the external device in each break time period of the ramp-up current input by the ramp-up current generation circuit until the impedance of the external device is acquired by detection in the last break time period of the n breaks.

In an example, the detecting an impedance of the external device specifically comprises: when the first break time of the ramp-up current starts, comparing a voltage of the port with a reference voltage; when the voltage of the port is greater than or equal to the reference signal, determining the impedance of the external device according to the corresponding number of times of breaks, the saved number of times of breaks, and a corresponding impedance range; when the voltage of the port is less than the reference voltage, determining whether the corresponding break is the last break of all the set breaks, and determining that the corresponding break is not the last break of all the set breaks; and upon completion of the break time, continuing to input the ramp-up current to the port; and when the second break time starts, comparing a voltage of the port with a reference voltage; when the voltage of the port is greater than or equal to the reference voltage, determining the impedance of the external device according to the corresponding number of times of breaks, the saved number of times of breaks, and a corresponding impedance range; when the voltage of the port is less than the reference voltage, determining whether the corresponding break is the last break of all the set breaks, determining that the corresponding break is not the last break of all the set breaks, and upon completion of the break time, continuing to input the ramp-up current to the port; when it is determined that the corresponding break is the last break of all the set breaks, determining the impedance of the external device according to the corresponding number of times of breaks, the saved number of times of breaks, and the corresponding impedance range; and analogously performing such determinations until the impedance of the external device is determined.

In an example, when it is determined that the corresponding break is the last break of all the set breaks, under the two circumstances that the voltage of the port is less than the reference signal, or greater than or equal to the reference signal, since the saved corresponding impedance ranges are different, in this case, the determined impedance ranges of the external device are two different impedance ranges. Using the parameters in Table 1 as an example, when the current break is the last break, that is, the last break is the seventh break of all the set breaks, and when the voltage of the port is less than the reference voltage, it is determined that the impedance range of the external device is 0 to 24 ohms, and when the voltage of the port is greater than or equal to the reference voltage, it is determined that the impedance range of the external device is 24 to 42 ohms.

The method may further comprise: when the impedance of the external device is acquired by detection, inputting a ramp-down current to the port, such that the input current is gradually reduced to zero. As such, the generated noise may be reduced. Herein, as illustrated in FIG. 2, ramp-down current refers to a current that has a defined falling slope as time passes.

The method may further comprise: sending the detected impedance of the external device to other circuit which need to acquire the impedance of the external device, for example, circuits which need to identify which type of device the external device is, or the like.

Based on the above described impedance detection circuit, an embodiment includes an integrated circuit. The integrated circuit comprises an impedance detection circuit. As illustrated in FIG. 1, the impedance detection circuit comprises a ramp-up current generation circuit 11 and an impedance determining circuit 12.

The ramp-up current generation circuit 11 inputs a ramp-up current including n breaks to a port of a device where the ramp-up current generation circuit is disposed, to which port an external device is connected. In the process of inputting the ramp-up current, the impedance determining circuit 12 detects an impedance of the external device in each break time period of the ramp-up current input by the ramp-up current generation circuit 11 until the impedance of the external device is acquired by detection in the last break time period of the n breaks.

The device where the ramp-up current generation circuit 11 is disposed may be an electronic device, such as a cellphone or the like.

As illustrated in FIG. 2, the ramp-up current including n breaks refers to a current which includes n break platforms and has a specific rising slop as the time goes by. The length of the break time period corresponding to a break platform may be defined according to actual needs, for example, defined to 5 ms or the like. The speed of the rising of the ramp-up current may also be defined according to actual needs, for example, defined to 3.125 μA/30 μs or the like. In addition, as illustrated in FIG. 2, in practice, after the ramp-up current is amplified, it can be seen that the ramp-up current is formed of several currents each having a rising platform.

In practice, the impedance range of the external device to be detected may be firstly defined to eight sub-ranges according to actual needs, as listed in Table 1. Since the impedance range is defined to eight sub-ranges, accordingly seven breaks need to be set. Correspondingly, corresponding seven breaks are preset in the ramp-up current generation current 11. That is, the ramp-up current generated by the ramp-up current generation circuit 11 includes seven breaks at maximum.

In practice, when a ramp-up current needs to be input, the ramp-up current generation circuit 11 inputs a ramp-up current to the port according to a speed set by the ramp-up current generation circuit 11. When the first break time is reached, the impedance determining circuit 12 detects the impedance of the external device in the first break time period. When the impedance of the external device fails to be detected in the first break time period, upon completion of the break time, the ramp-up current generation circuit 11 continues to input the ramp-up current to the port. Correspondingly, when the second break time is reached, the impedance determining circuit 12 detects the impedance of the external device in the second break time period. When the impedance of the external device fails to be detected in the second break time period, upon completion of the break time, the ramp-up current generation circuit 11 continues to input the ramp-up current to the port. Such operations are performed analogously until the impedance determining circuit 12 acquires by detection the impedance of the external device. Upon detection of the impedance of the external device, the ramp-up current generation circuit stops inputting the ramp-up current to the port. In this case, the value of n is equal to the number of break time periods corresponding to the detected impedance of the external device.

To be specific, the value of n is an integer greater than 0, and the maximum value of n is equal to the number of breaks that are predetermined in the ramp-up current generation circuit 11. For example, if the number of breaks that are predetermined in the ramp-up current generation circuit 11 is 7 and the impedance determining circuit 12 acquires by detection the impedance of the external device in the fourth break time period, the value of n is 4, when the impedance determining circuit 12 detects the impedance of the external device in the seventh break time period, the value of n is 7. To be specific, the maximum value of n is 7.

In practice, the detected impedance of the external device is a value range. Using Table 1 as an example, the detected impedance of the external device may be 0 to 24 ohms, 24 to 42 ohms, 42 to 100 ohms, 100 to 200 ohms, 200 to 450 ohms, 450 to 1000 ohms, 1000 to 15000 ohms, or greater than 15000 ohms.

The external device may be an external audio device, for example, an earphone, a speaker, or the like.

In practice, the impedance determining circuit 12 may send the detected impedance of the external device to other circuits which need to acquire the impedance of the external device, for example, circuits which need to identify which type of device the external device is, or the like.

When the impedance of the external device is acquired by detection, the ramp-up current generation circuit 11 input a ramp-down current to the port, such that the input current is gradually reduced to zero. As such, the generated noise may be reduced. Herein, as illustrated in FIG. 2, the ramp-down current refers to a current which has a specific falling slope as the time goes by.

As illustrated in FIG. 3, the ramp-up current generation circuit may comprise: an enable circuit 111, a control circuit 112, and a digital-to-analog conversion circuit 113.

When a ramp-up current needs to be input, the enable circuit 111 inputs an enable signal to the digital-to-analog conversion circuit 113. Upon receiving the enable signal input by the enable circuit 111, the digital-to-analog conversion circuit 113 converts the ramp-up current that needs to be input from a digital signal to an analog signal and inputs the converted analog signal of the ramp-up current to the port according to the clock control signal output by the control circuit 112. The control circuit 112 inputs a corresponding clock control signal to the digital-to-analog conversion circuit 113 according to a magnitude of a ramp-up current that needs to be input.

Herein, the implementation of the enable circuit 111 is a common technical means for a person skilled in the art, which is thus not described herein any further.

The control circuit 112 may comprise a latch clock generation circuit. As illustrated in FIG. 4, the latch clock generation circuit may comprise: a first buffer circuit 1121, a delay circuit 1122, and a second buffer circuit 1123. An input terminal of the first buffer circuit 1121 is connected to an input terminal CLK_in of a control clock, and an output terminal of the first buffer circuit 1121 is connected to an input terminal of the delay circuit 1122. An output terminal of the delay circuit 1122 is connected to an input terminal of the second buffer circuit 1123. An output terminal of the second buffer circuit 1123 is connected to the digital-to-analog conversion circuit 113. That is, the latch clock signal CLK generated by the latch clock generation circuit is transmitted to the digital-to-analog conversion circuit 113. Herein, in case of a break of the ramp-up current, the latch clock generation circuit does not output a latch clock signal. As such, it is ensured that the power source of the digital-to-analog conversion circuit remains constant, such that the impedance of the external device can be more precisely detected.

In practice, as illustrated in FIG. 5, the control circuit 112 provides a multi-bit binary control signal that progressively increases or decreases as the clock varies, such that the digital-to-analog conversion circuit 113 generates a corresponding ramp-up current or ramp-down current. In addition, in the generated ramp-up current, within various break time periods, the multi-bit control signal stops varying with the clock. To be specific, the ramp-up current stops progressively increasing, such that the current output by the digital-to-analog conversion circuit 113 stops staying on the current of the corresponding break, thereby implementing the "current platform" which is needed during the impedance detection. Herein, bits of the binary control signal provided by the control circuit 112 may be defined according to actual needs. For example, using the parameters in Table 1 as an example, it may be determined that the binary control signal provided by the control circuit 112 has 11 bits.

As illustrated in FIG. 6, the digital-to-analog conversion circuit 113 may comprise a binary decoder circuit 1131 and a thermometer decoder circuit 1132.

When the ramp-up current that needs to be input is equal to the maximum current that can be processed by the binary decoder circuit 1131, the control circuit 112 inputs a corresponding clock control signal to the binary decoder circuit 1131, and the binary decoder circuit 1131 converts the ramp-up current that needs to be input from a digital signal to an analog signal and inputs the converted analog signal of the ramp-up current to the port according to the received clock control signal input by the control circuit 112.

When the ramp-up current that needs to be input is greater than the maximum current that can be processed by the binary decoder circuit 1131, the control circuit 112 inputs a corresponding clock control signal to the thermometer decoder circuit 1132, and the thermometer decoder circuit 1132 converts the ramp-up current that needs to be input from a digital signal to an analog signal and inputs the converted analog signal of the ramp-up current to the port according to the received clock control signal input by the control circuit 112. Alternatively, the control circuit 112 simultaneously inputs a corresponding clock control signal to the binary decoder circuit 1131 and the thermometer decoder circuit 1132, and the binary decoder circuit 1131 and the thermometer decoder circuit 1132 each convert the ramp-up current that needs to be input from a digital signal to an analog signal and input the converted analog signal of the ramp-up current to the port according to the received clock control signal input by the control circuit 112.

In practice, as illustrated in FIG. 7A and FIG. 7B, the binary decoder circuit 1131 may comprise: a first reference current generation circuit 11311, a current source 11312, a first delay shaping circuit 11313, a latch circuit 11341, and a second delay shaping circuit 11315. In FIG. 7A, eni indicates an enable signal that is output by the enable circuit 112, and enb indicates a reverse signal of the enable signal that is output by the enable circuit 112. In an example, the first reference current generation circuit 11311 may be formed of seven PMOSFETs, six NMOSFETs, an operation amplifier, and a trim resistor. Bits of the binary decoder circuit 1131 can be defined according to actual needs, the number of different current sources in the current source 11312 is the same as the number of bits. For example, using the parameters in Table 1 as an example, the number of bits in the binary decoder circuit 1131 may be defined to 4. Correspondingly as illustrated in FIG. 7A, the current source 11312 is formed of 17 PMOSFETs, thereby forming four different current sources capable of outputting currents including 3.125 μA, 6.25 μA, 12.5 μA, and 25 μA, and correspondingly as illustrated in FIG. 7B, the first delay shaping circuit 11313 and the second delay shaping circuit 11315 each comprise the delay shaping circuit corresponding to each of the four current sources. The trim resistor is directed to enabling the reference current generated by the first reference current generation circuit 11311 to be constant within a defined error range. The latch circuit 11314 is directed to reducing noise pulses of the analog signals, and enabling the generated analog signal of the ramp-up current to be smoother. To be specific, the function of the latch circuit 11314 may be understood as reducing glitches of the analog signals.

In practice, as illustrated in FIG. 8A, FIG. 8B, and FIG. 8C, the thermometer decoder circuit 1132 may comprise: a thermometer switch matrix 11321, a thermometer current source matrix 11322 comprising a second reference current generation circuit, and a corresponding auxiliary circuit. Bits of the thermometer decoder circuit 1132 are defined according to actual needs. Correspondingly, the number of switch units in the thermometer switch matrix 11321 is defined according to actual needs, and the number of current source units in the thermometer current source matrix 11322 is also defined according to actual needs, and the number of switch units is equal to the number of current source units. For example, using the parameters in Table 1 as an example, the number of bits in the thermometer decoder circuit 1132 may be defined to 7, and correspondingly, the number of switch units is 127, the number of current source units is 127, and the current output by each of the current source units is 50 μA. As illustrated in FIG. 8A, the auxiliary circuit may comprise: a row decoder, a column decoder, and latches respectively corresponding to the row decoder and the column decoder, and the like. When the thermometer decoder circuit 1132 is operating, as illustrated in FIG. 9, the corresponding switch units in the thermometer switch matrix 11321 are switched on according to the digital signal of the input ramp-up current, such that the current source units connected to the switch units output currents, thereby outputting a desired ramp-up current to the port. In FIG. 9, the matrix on the left is the thermometer switch matrix, and the matrix on the right is the thermometer current source matrix.

As illustrated in FIG. 10, to reduce the linear error affection, the corresponding current source units are sequentially switched on in a centrosymmetric manner. To reduce the quadratic error affection, the current source units in the thermometer current source matrix 11322 are disposed at centers of four bump pads, and the corresponding current source units are sequentially switched on in an inward or outward diffusion manner by means of being symmetric to the centers of the four bump pads and centering on a disposed boundary circle. Herein, the linear error is caused by the process of fabricating the components in the current source units, for example, dopants, the thickness of the oxide, and the like. The quadratic error can be caused by the packaging and separation process of the chip where the impedance detection circuit according to the embodiments herein is disposed, for example, the temperature maintained in the process of growing the bumps, the stress generated in the fabrication process, and the like. In FIG. 10, the black block indicates a set boundary circle.

In practice, as illustrated in FIG. 11, the switch unit may be formed of a NOR gate, two inverters, a NAND gate, and three PMOSFETs.

As illustrated in FIG. 12, the impedance determining circuit 12 may include a comparison circuit 121 and a logical operation circuit 122, wherein the comparison circuit 121 may be implemented by a comparator. An inverting input terminal of the comparator is connected to a reference voltage, and a non-inverting input terminal of the comparator is connected to the port.

The logical operation circuit 122 determines, according to a comparison result of the comparator 121, whether the impedance of the external device is acquired by detection.

To be specific, the ramp-up current generation circuit 11 inputs a ramp-up current to the port. When the first break time is reached, the comparison circuit 121 compares a voltage of the port with a reference voltage, and sends a comparison result to the logical operation circuit 122. When the comparison result is a high voltage signal, the logical operation circuit 122 determines the impedance of the external device according to the high voltage signal, the corresponding number of times of breaks, the saved number of times of breaks, and a corresponding impedance range. When the comparison result is a low voltage signal, the logical operation circuit 122 determines whether the break is the last break of all the set breaks, and the logical operation circuit 122 triggers the ramp-up current generation circuit 11 when it is determined that the break is not the last break. The ramp-up current generation circuit 11 continues to input the ramp-up current to the port upon receiving the trigger of the logical operation circuit 122 and upon completion of the corresponding break time. When the second break time is reached, the comparison circuit 121 compares a voltage of the port with a reference voltage, and sends a comparison result to the logical operation circuit 122. When the comparison result is a high voltage signal, the logical operation circuit 122 determines the impedance of the external device according to the high voltage signal, the corresponding number of breaks, the saved number of breaks, and a corresponding impedance range. When the comparison result is a low voltage signal, the logical operation circuit 122 determines whether the break is the last break of all the set breaks, and the logical operation circuit 122 sends to the ramp-up current generation circuit 111 a command for continuing to input the ramp-up current when it is determined that the break is not the last break. When it is determined that the break is the last break, the logical operation circuit 122 determines the impedance of the external device according to the low voltage signal, the corresponding number of times of breaks, the saved number of times of breaks, and a corresponding impedance range. Such determinations are performed analogously until the impedance of the external device is determined.

Herein, it should be noted that when the logical operation circuit 122 determines that the current break is the last break of all the set breaks, and when the comparison result is a low voltage signal and the comparison result is a high voltage signal, the saved corresponding impedance ranges are different. Therefore, in this case, the impedance ranges of the external device that are determined are two different impedance ranges. Using the parameters in Table 1 as an example, when the current break is the last break, that is, the last break is the seventh break of all the set breaks, and when the comparison result is a low voltage signal, it is determined that the impedance range of the external device is 0 to 24 ohms, and when the comparison result is a high voltage signal, it is determined that the impedance range of the external device is 24 to 42 ohms.

When one break of all the set breaks ends, the reference voltage of the comparison circuit 121 may be correspondingly regulated. Using the parameters in Table 1 as an example, the input ramp-up current and the corresponding reference voltage of the comparator 122 may be referenced to Table 2.

In practice, to improve the detection precision, the comparison circuit 121 may be enabled to output comparison results multiple times according to actual needs. For example, the comparison circuit 121 may be enabled to output the comparison results three times, and correspondingly, the logical operation circuit 122 determines the comparison result is a high voltage signal or a low voltage signal according to the comparison results output three times. To be specific, when the comparison results output three times indicate more than two high voltage signals, it is determined that the comparison result is a high voltage signal, and when the comparison result output three times indicate more than two low voltage signals, it is determined that the comparison result is a low voltage signal. Herein, the high voltage signal refers to a signal indicating that the voltage of the port is greater than the reference voltage, and the low voltage signal refers to a signal indicating that the voltage of the port is less than the reference voltage. For example, if the signals output by the comparator include two types of signals 0 and 1, then 1 is a high voltage signal and 0 is a low voltage signal.

As illustrated in FIG. 13, in practice, a non-inverting input pin of the comparator is connected to an external device. During the impedance detection, a ramp-up current is input to the non-inverting input pin, and the impedance of the external device is detected in each break time period of the ramp-up current. In addition, after the impedance of the external device is acquired by detection, a ramp-down current is input to the non-inverting input pin of the comparator, such that the input current is gradually reduced to zero. As such, the generated noise may be reduced.

It should be noted that: When the impedance detection circuit is operating, some components in various circuits of the impedance detection circuit also need to be connected to a power source, and additionally need to be grounded. As such, the impedance detection circuit is capable of operating normally. Therefore, in the corresponding drawings, pwrp indicate a power source node, and pwrn indicates a ground node.

According to the integrated circuit provided in the embodiments described herein, the ramp-up current generation circuit inputs a ramp-up current including n breaks to a port of the device where the ramp-up current generation circuit is disposed, to which port an external device is connected. In the process of inputting the ramp-up current, the impedance determining circuit detects an impedance of the external device in each break time period of the ramp-up current input by the ramp-up current generation circuit until the impedance of the external device is acquired by detection in the last break time period of the n breaks. Since the impedance of the external device is detected in each break time period of the ramp-up current before the impedance of the external is acquired by detection in the last break time period of the n breaks, accordingly the impedance of the external device may be precisely acquired by detection.

In addition, the current input to the port of the device, to which port the external device is connected is a ramp-up current. As such, during the impedance detection, a great pulse may not be generated. Great pulses may generate great noise, which cannot be eliminated. In other words, since the current input to the port of the device, to which port the external device is connected is a ramp-up current, during the impedance detection, less noise is generated, and thus the user experience is improved.

Those skilled in the art shall understand that the embodiments may be described as illustrating methods, systems, or computer program products. Therefore, hardware embodiments, software embodiments, or hardware-plus-software embodiments may be used to illustrate the present invention. In addition, the present invention may further employ a computer program product which may be implemented by at least one non-transitory computer-readable storage medium with an executable program code stored thereon. The non-transitory computer-readable storage medium comprises but not limited to a disk memory and an optical memory.

The embodiments disclosed herein are described based on the flowcharts and/or block diagrams of the method, device (system), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, wherein the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

ADDITIONAL NOTES AND EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An impedance detection circuit, comprising:

a ramp-up current generation circuit; and an impedance determination circuit, wherein the ramp-up current generation circuit is configured to generate and provide a ramp-up current comprising multiple break platforms in the ramp-up current to a port of an electronic device, according to an indication of the impedance determination circuit, wherein the electronic device is connectable to a peripheral device via the port, and wherein the impedance determination circuit is configured to detect an impedance of the peripheral device during the multiple break platforms.

2. The impedance detection circuit according to claim 1, wherein the ramp-up current generation circuit comprises:

an enable circuit, configured to generate an enable signal;

a control circuit, configured to generate a binary control signal corresponding to a value of the ramp-up current to be generated; and a digital-to-analog conversion circuit, configured to convert the binary control signal to the ramp-up current in response to the enable signal, and to provide the ramp-up current to the port.

3. The impedance detection circuit according to claim 2, wherein the digital-to-analog conversion circuit comprises a thermometer decoder circuit configured to provide the ramp-up current to the port, wherein the thermometer decoder circuit comprises:

a thermometer switch matrix comprising a plurality of switch cells; and a thermometer current source array comprising a plurality of current source cells, and wherein the switch cells sequentially turn on the current source cells in a manner of being symmetric to a center of the thermometer current source array.

4. The impedance detection circuit according to claim 2, wherein the digital-to-analog conversion circuit comprises a thermometer decoder circuit configured to provide the ramp-up current to the port, wherein the thermometer decoder circuit comprises:

a thermometer switch matrix comprising a plurality of switch cells; and a thermometer current source array comprising a plurality of current source cells, and wherein the current source cells are disposed at a center of four bump pads, and the switch cells sequentially turn on the current source cells in a manner of being symmetric to the center of the four bump pads and diffusing inwards or outwards from a preset boundary circle.

5. The impedance detection circuit according to claim 1, wherein the impedance determination circuit comprises:

a comparison circuit, configured to compare a voltage at the port with a reference voltage; and a logical operation circuit, configured to detect the impedance of the peripheral device according to the comparison.

6. The impedance detection circuit according to claim 5, wherein the logical operation circuit is configured to determine an impedance range of the peripheral device according to a portion of the ramp-up current immediately before a break platform once the voltage at the port becomes greater than the reference voltage, or wherein the logical operation circuit is configured to determine the impedance range of the peripheral device according to a portion of the ramp-up current after a last one of the multiple break platforms, when the voltage at the port stays lower than the reference voltage during all the multiple break platforms.

7. The impedance detection circuit according to claim 1, wherein the ramp-up generation circuit is configured to generate and provide a ramp-down current to the port when the impedance is detected.

8. The impedance detection circuit according to claim 1, wherein the impedance detection circuit is included in an integrated circuit.

9. An impedance detection method, comprising:

generating and providing a ramp-up current using a ramp-up current generation circuit, the ramp-up current comprising multiple break platforms in the ramp-up current to a port of an electronic device, wherein the electronic device is connectable to a peripheral device via the port; and detecting an impedance of the peripheral device using an impedance determination circuit during the multiple break platforms.

10. The method according to claim 9, further comprising:

generating, using a control circuit, a binary control signal corresponding to a value of the ramp-up current to be generated; and converting, using a digital-to-analog conversion circuit, the binary control signal to the ramp-up current in response to an enable signal.

11. The method according to claim 10, wherein said converting the binary control signal to the ramp-up current comprises:

using a binary decoder circuit to provide the ramp-up current to the port, when the ramp-up current to be generated is smaller than or equal to a maximum current that can be processed by the binary decoder circuit;

or using a thermometer decoder circuit or a combination of the binary decoder circuit and the thermometer decoder circuit to provide the ramp-up current to the port, when the ramp-up current to be generated is greater than the maximum current that can be processed by the binary decoder circuit.

12. The method according to claim 11, wherein said using a thermometer decoder circuit or a combination of the binary decoder circuit and the thermometer decoder circuit to provide the ramp-up current to the port comprise:

in a thermometer decoder circuit comprising a thermometer current source array with a plurality of current source cells, sequentially turning on the current source cells in a manner of being symmetric to a center of the thermometer current source array.

13. The method according to claim 11, wherein said using a thermometer decoder circuit or a combination of the binary decoder circuit and the thermometer decoder circuit to provide the ramp-up current to the port comprise:

in a thermometer decoder circuit with a plurality of current source cells, wherein the current source cells are disposed at a center of four bump pads, sequentially turning on the current source cells in a manner of being symmetric to the center of the four bump pads and diffusing inwards or outwards from a preset boundary circle.

14. The method according to claim 9, wherein said detecting an impedance of the peripheral device during the multiple break platforms comprises:

comparing a voltage at the port with a reference voltage; and once the voltage at the port becomes greater than the reference voltage, determining an impedance range of the peripheral device according to a portion of the ramp-up current immediately before a current break platform; or when the voltage at the port stays lower than the reference voltage during all the multiple break platforms, determining the impedance range of the peripheral device according to a portion of the ramp-up current after a last break platform.

15. The method according to claim 9, further comprising: receiving a ramp-down current at the port, upon detection of the impedance of the peripheral device.

16. An electronic device, comprising:

an impedance detection circuit, comprising:

a ramp-up current generation circuit; and an impedance determination circuit, wherein the ramp-up current generation circuit is configured to generate and provide a ramp-up current comprising multiple break platforms in the ramp-up current to a port of an electronic device, according to an indication of the impedance determination circuit, wherein the electronic device is connectable to a peripheral device via the port, and wherein the impedance determination circuit is configured to detect an impedance of the peripheral device during the multiple break platforms; and a controller, configured to determine a type of the peripheral device according to the detected impedance of the peripheral device.

17. The electronic device according to claim 16, wherein the ramp-up current generation circuit comprises:

an enable circuit, configured to generate an enable signal;

a control circuit, configured to generate a binary control signal corresponding to a value of the ramp-up current to be generated; and a digital-to-analog conversion circuit, configured to convert the binary control signal to the ramp-up current in response to the enable signal, and to provide the ramp-up current to the port.

18. The electronic device according to claim 17, wherein the digital-to-analog conversion circuit comprises a thermometer decoder circuit configured to provide the ramp-up current to the port, wherein the thermometer decoder circuit comprises:

a thermometer switch matrix comprising a plurality of switch cells; and a thermometer current source array comprising a plurality of current source cells, and wherein the switch cells sequentially turn on the current source cells in a manner of being symmetric to a center of the thermometer current source array.

19. The electronic device according to claim 17, wherein the digital-to-analog conversion circuit comprises a thermometer decoder circuit configured to provide the ramp-up current to the port, wherein the thermometer decoder circuit comprises:

a thermometer switch matrix comprising a plurality of switch cells; and a thermometer current source array comprising a plurality of current source cells, and wherein the current source cells are disposed at a center of four bump pads, and the switch cells sequentially turn on the current source cells in a manner of being symmetric to the center of the four bump pads and diffusing inwards or outwards from a preset boundary circle.

20. The electronic device according to claim 16, wherein the ramp-up generation circuit is configured to generate and provide a ramp-down current to the port when the impedance is detected.

* * * * *